Figure 1:
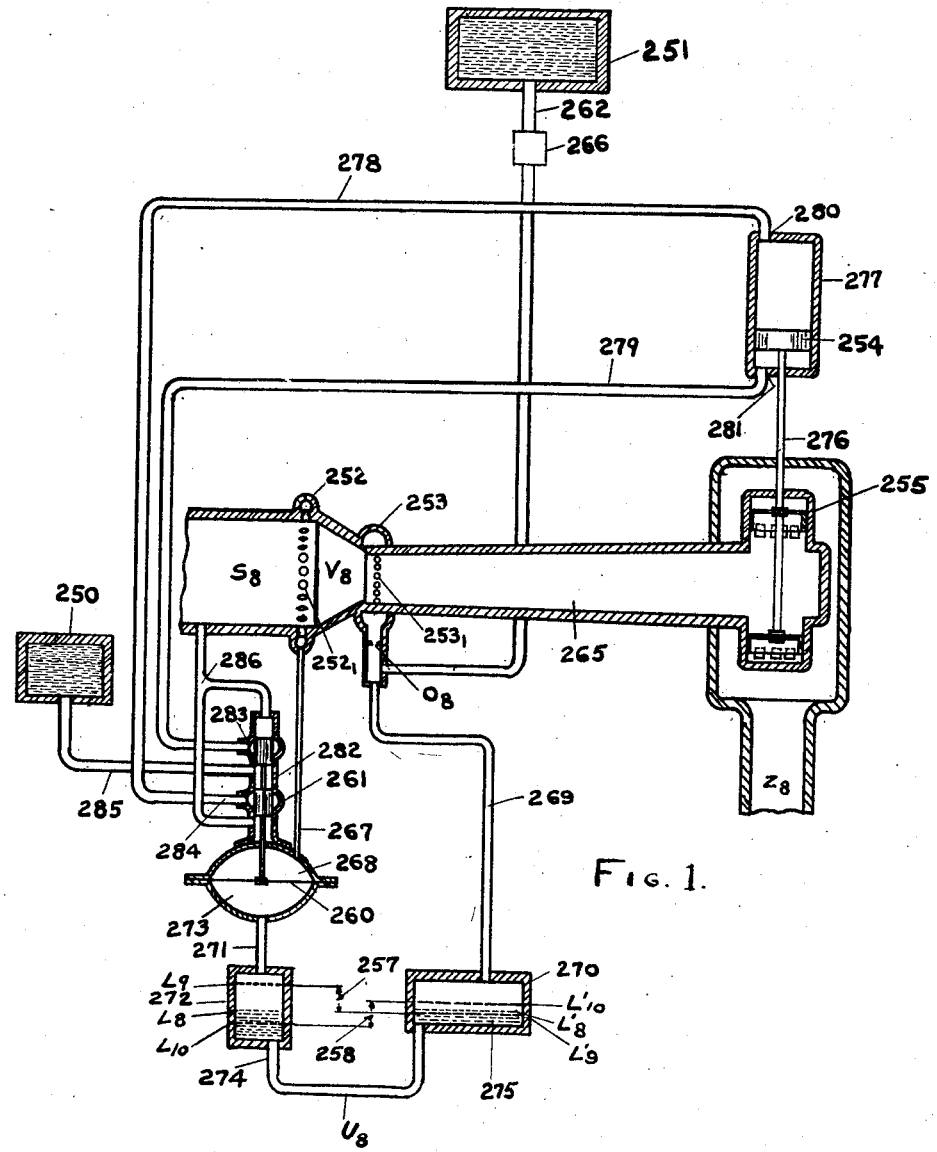

March 12, 1929.  G. G. EARL  1,704,966
FLUID SYSTEM
Original Filed July 20, 1922  2 Sheets-Sheet 1

George G. Earl,
INVENTOR.

BY Richey Slough & Watts
HIS ATTORNEYS

March 12, 1929.   G. G. EARL   1,704,966
FLUID SYSTEM
Original Filed July 20, 1922   2 Sheets-Sheet 2

George G. Earl,
INVENTOR.

BY Richey Slough & Watts,
HIS ATTORNEYS

Patented Mar. 12, 1929.

1,704,966

UNITED STATES PATENT OFFICE.

GEORGE G. EARL, OF NEW ORLEANS, LOUISIANA.

FLUID SYSTEM.

Original application filed July 20, 1922, Serial No. 576,260½. Divided and this application filed June 11, 1925. Serial No. 36,349.

My invention relates to means and methods for governing fluid systems, and is useful for numerous purposes, such as controlling fluid flows, governing apparatus for indicating and regulating fluid flows, maintaining in constant ratio two independent flows of the same or different fluids, and at different pressures or densities, regulating a gas flow in cubic feet or other dimension per unit of time independent of its density, or in pounds of gas, or to maintain a constant pressure measured either from absolute zero of pressure or from atmosphere, governing such objects as the rudders of vessels and thereby controlling their positions or navigation in fluids, and many other uses, too numerous to mention here.

Preventing overreaching and underreaching of controlling mechanisms is one of the principal objects of my invention. It is well known that apparatus now employed for such purposes as automatically controlling fluid flows, is subject to overreaching and underreaching, always with deleterious and sometimes with disastrous results.

By my invention, which relies for its operation upon well known hydrostatic and hydraulic laws, such overreaching and underreaching is avoided. Correct and proper automatic control is secured.

Simplicity, rapidity of action and cheapness of construction are other objects of my invention.

These and other objects, as well as the invention itself, may be better understood from descriptions and illustrations of embodiments of my invention.

In the drawings—

Figure 2:
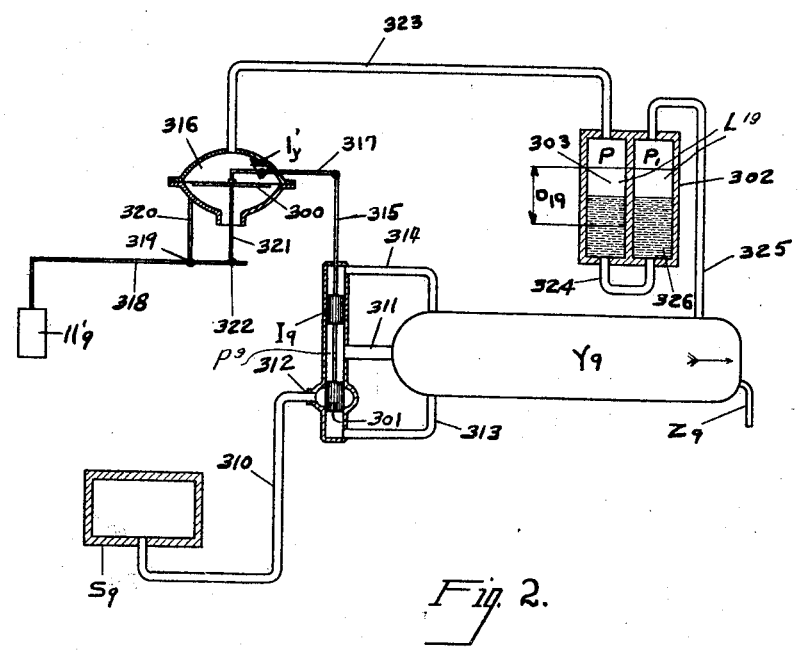

Fig. 1 is a diagrammatic view of an embodiment of my invention; and Fig. 2 is a similar view of a second embodiment of my invention.

In Fig. 1 I have illustrated a flow controller, wherein a flow entering at 262 and passing through $O_s$ can govern and measure a flow from $S_s$ to the outlet $Z_s$. Means are provided in this embodiment for changing the larger flow through 265 very rapidly if great changes occur in the smaller flow 262 and very slowly if only small changes occur in the smaller flow. By interposing the mercury U-tube $U_s$ having the levels $L_s$ and $L_s'$ which are level or in the same horizontal plane when the valve 261 is in neutral position and the pressure on the approach side of the orifice $O_s$ is equal to the pressure on the approach side 252 of the venturi $V_s$. Any difference between these two pressures will be effective in the mercury levels of $L_s$ and $L_s'$. We will assume that the mercury displacement which is equal to the full motion of the valve 261 in either direction is the distance 257 for upward motion and 258 for downward motion. When as much difference of pressure, as indicated by 257 or 258 exists, the valve 261 will be wide open, operating the piston 254 and the main throttle 255 very rapidly, as it may, because as rapid motion brings decreased difference of pressure, the valve 261 is gradually closed until when final equality of pressure is reached, it is entirely closed and ready to make instant reversal, if the pressures require, the diaphragm 260 having been under substantially equal pressures throughout, due to the counterpressure built up by the mercury heads 257 or 258, or any parts of such heads corresponding to a departure from equality of the governed and governing pressures.

At 251 is shown a source of fluid pressure from which fluid flows through the duct 262, through the orifice $O_s$ and into the conduit 265 at the throat 253 of the venturi $V_s$. A meter 266 may be placed in the duct 263 to measure the flow thereof, which will be proportional to the flows through the main 265, as is now well known. The duct 265 leads from a source, not shown, here indicated by the reference $S_s$, through the venturi $V_s$, a main throttle valve 255 to a relatively low pressure outlet $Z_s$. A circular chamber 252 is formed about the conduit at the approach of the venturi and the entrance thereto covered by perforated screen $252_1$. Likewise, a circular chamber 253 and a screen $253_1$ are employed at the throat of the venturi. A duct 267 conveys pressure from the approach of the venturi to a cell 268 on one side of the diaphragm 260. A duct 269 conveys pressure from the throat side of the orifice $O_s$ to a container 270. A duct 271 connects a second container 272 with the cell 273 on the other side of the diaphragm 260.

The containers 270 and 272 are connected by a U-member 274. The parts 270, 272 and 274 constitute one form of a U-tube and contain a quantity of mercury 275, a part of which is normally in each container and the balance fills the member 274. The relative areas of the horizontal surface of the containers may be varied to suit the convenience and the particular purposes to be accomplished. The valve 255 is controlled by a piston 254, to which it is connected by any suitable means, such as a piston rod 276. The piston is mounted in a cylinder 277, to which are connected two ducts 278 and 279. The duct 278 enters the cylinder 277 at a port 280 and the duct 279 enters the cylinder 277 at a port 281. The ports are shown one at each end of the cylinder.

The valve chamber of the valve 261 is shown at 282. The valve 261 consists of a spool-shaped valve normally closing the ports 283 and 284 where the ducts 278 and 279 respectively enter the valve chamber. A duct 285 connects a source of operating pressure 250 with the central portion of the valve chamber and a duct 286 connects each end of the valve chamber with some outlet of lower pressure, such as $S_8$, to maintain a constant pressure on the two ends of the valves, and permit waste from 261 or 283.

When the pressure on the approach side of $O_8$ changes, the pressure over the surface $L_8'$ of the column of mercury in the container 270 will be changed and the pressure will be transmitted through the mercury and the confined water over same to the bottom of the diaphragm 260. The position of the valve 261 will be changed, admitting fluid from the source 250 to one of the ducts 278 or 279 and thence to the piston cylinder 277 and exerting a pressure over or under the piston, as the case may be, thereby operating the valve 255 at a speed proportional to the amount of movement of the valve 261. Water will flow to waste from the other side of the piston chamber through the other end of the ducts 278 or 279, as the case may be, through the valve chamber, the duct 286, into the conduit 265. As this movement continues, the level of the mercury in the containers 270 and 272 will be gradually restored, since by the time the parts have been moved to the desired position to correct for the increase in pressure on the approach side of $O_8$, that is, when the valve 255 has been moved to vary the flow through 265 so that it will be proportional to the flow 262 as a result of the change in flow through 262, the opposition of the longer of the two columns of mercury in the U-tube to the shorter will have brought the system to a halt, by restoring the mercury surfaces to level and the pilot valve 261 to neutral, thereby preventing any overreaching, or if the operation is in the reverse direction, any underreaching. It will be readily appreciated that the containers may be so varied in shape and capacity as to provide for each particular case.

Referring now to the embodiment shown in Fig. 2, a source of fluid pressure, such as a fluid conduit under pressure, is shown at $S_9$ supplying the system $Y_9$ from which a varying and irregular flow may be drawn through outlets, as at $Z_9$, and in which it is desired to maintain a constant pressure while supplying said fluctuating demand. $S_9$ and $Y_9$ are connected by ducts 310, 311 and a valve chamber $I_9$ in which a valve 301 is housed controlling a port 312 in the passageway of fluid from the source to the outlet. Ducts 313 and 314 are provided to conduct an equal fluid pressure to each end of the valve. The valve is connected by suitable means, such as stems 315 and 317 to a movable member, here shown as a vibratile diaphragm 300 mounted inside a chamber 316.

The diaphragm is constantly pressed or biased upwardly by some suitable means, such as a biasing weight 11'9 suspended from the lever 318, pivoted at 319, by some suitable means, such as a hanger 320, suspended from the chamber 316. A stem 321 connected to one side of the diaphragm engages the end 322 of the lever opposite the end upon which the weight is connected.

As will be seen, the weight constantly endeavors to open the valve 301 and increase the flow through $Y_9$. The upper portion of the chamber 316 is connected by a duct 323 to a tube 303, which is associated with a second tube 302 and to which it is connected by any suitable means, such as a tube 324. The tube 302 is connected by a duct 325 with the system $Y_9$, so that the pressure is conveyed from $Y_9$ to the tube 302.

A quantity of fluid, such as mercury, is shown at 326, normally rising to a level $L_{19}$ in the tubes. The space consisting of the portion of the chamber 316 over the diaphragm 300, the tube 323 and the upper portion of the tube 303 is filled with a relatively light liquid, such as water, which engages the surface of the mercury in such tube. The pressure in the system $Y_9$ reacting through the mercury U-tube 302, 324, 303 and the intervening water filling the space from $L_{19}$ to the upper side of diaphragm 300 must be sufficient to counterbalance the upward thrust of the weight 11'9 against the diaphragm 300. For any given weight 11'9 a certain pressure $P_9$ acting over diaphragm 300 will be required, and is substantially the pressure at which this system $Y_9$ is to be maintained.

Assume that the valve 301 is closed when the mercury stands at the level $L_{19}$ in the tubes 302 and 303, in which case the pressure P must equal the pressure $P_1$, acting through tube 325 upon the surface of the mercury in the tube 302. Now if draft is made from $Y_9$ until $P_1$ is less than P by the mercury head $D_{19}$ (we will assume that this corresponds to the full opening of the valve 301, and therefore, to maximum possible corrective effect), the valve 301 will be opened wide. If this effect builds any increase in pressure $P_1$, it will be reflected by a corresponding decrease in $D_{19}$, and a corresponding closure of valve 301. There is, therefore maintained a pressure in $Y_9$ which will equal $P_9$ plus $D_{19}$ when the valve 301 is wide open and $P_9$ when the valve 301 is fully closed, and since the variation $D_{19}$ can be made as much or as little as desired to correspond with the full extent of the valve motion of the valve 301, the pressure $P_9$ can be maintained to within just as close limits as may be desired, and still maintain definite valve motion for definite pressure changes within such limits.

It will be seen that when the surfaces of the mercury in 302 and 303 occupy different elevations with respect to each other, the amount of mercury driven from one tube to the other vacates a space which is occupied in the tube thus partly vacated by water, so that the resistance of the column of mercury, which is increasing in height to further change, increases more and more as its height is increased, thus acting to prevent over and underreaching. It will also be seen that the amount of water filled into the closed spaces between the diaphragm 300 and the mercury surface $L_{19}$ regulates the position of the valve at different positions of the difference of mercury level $D_{19}$, thus giving easy adjustment by its regulation to the position of the valve 301 in relation to the position of the diaphragm 300 and the mercury pressure D.

This application is a division from, and continuation of my previously filed co-pending application Serial No. 576,260½, filed July 20, 1922, which is a division of my previously filed application Serial No. 251,662, filed August 27, 1918, and in part a refiling of claims covering certain inventions disclosed therein.

I claim:—

1. In a fluid flow controller, a source of fluid under pressure, a conduit, a valve controlling the flow of fluid from said source to said conduit, said conduit having a reservoir portion and a discharge portion, the discharge portion offering higher resistance to fluid flow than the reservoir portion, an element responsive to fluid pressure to effect the operation of said valve, a duct for communicating fluid pressure from said reservoir portion to said element, biasing means exerting a constant force against said element to oppose the force of the communicated fluid pressure and a body of liquid of higher specific gravity than the fluid from said source trapped in said duct, the body of heavier liquid comprising two portions connected by a flow restricting passage of relatively higher resistance to fluid flow than the portions of the duct containing such trapped liquid body portions.

2. In a fluid flow controller, a source of fluid under pressure, a conduit, a valve controlling the flow of fluid from said source to said conduit, said conduit having a reservoir portion and a discharge portion, the discharge portion offering higher resistance to fluid flow than the reservoir portion, an element responsive to fluid pressure to effect the operation of said valve, a duct for communicating fluid pressure from said reservoir portion to said element, biasing means exerting a constant force against said element to oppose the force of the communicated fluid pressure and a body of liquid of higher specific gravity than the fluid from said source trapped in said duct, said element adapted to increase the flow of fluid through the valve upon decreases of fluid pressure communicated to it by said duct below the opposing pressure exerted by said biasing means.

3. The process of regulating a fluid pressure comprising the introduction of a body of a heavier liquid between two lighter bodies of fluid non-miscible therewith, communicating pressure from a first of the bodies of lighter fluid to a movable element, communicating a counterbalancing standard pressure thereto, and in controlling the fluid pressure of the second body by movements of the element from a neutral position wherein the opposing pressures act thereon with equal effect, and in dampening movements of the interposed heavier liquid.

4. In a fluid system, the combination with a fluid conduit for passing a flow to be regulated, a U-tube with a pair of upright arms with a relatively restricted fluid passage joining them at their bottom portions containing a liquid, non-miscible with the fluid of said flow, a duct for communicating pressure of fluid of the conduit to the upper surface of the liquid in one of the arms, means for varying the pressure of fluid in said conduit, said means actuatable responsive to variations in level of liquid in the other arm to so vary the pressure in the conduit as to restore or tend to restore the liquid levels to normal levels, and a weight or the like for said means opposing the effects of liquid level variations in one direction from normal, with a governing force, said passage offering such resistance to fluid flow of liquid as to dampen the responsiveness of said means to the above recited effects of variations of pressure in the conduit.

5. The fluid system as defined in substance in claim 4, characterized by the provision of a diaphragm or the like, exposed on one side, through the medium of a column of a fluid lighter in specific gravity than that in the U-tube, to the pressure effects of variations in level of liquid in the tube arms, and weighted to oppose variations of such pressure effects in one direction from a standard pressure.

In testimony whereof I hereunto affix my signature this 30th day of May, 1925.

GEORGE G. EARL.